United States Patent
Pratt

(10) Patent No.: US 12,517,182 B2
(45) Date of Patent: Jan. 6, 2026

(54) STATE OF CHARGE ESTIMATOR FOR BATTERIES WITH VOLTAGE HYSTERESIS

(71) Applicant: Analog Devices International Unlimited Company, Limerick (IE)

(72) Inventor: Patrick Pratt, Mallow (IE)

(73) Assignee: Analog Devices International Unlimited Company, Limerick (IE)

(*) Notice: Subject to any disclaimer, the term of this patent is extended or adjusted under 35 U.S.C. 154(b) by 154 days.

(21) Appl. No.: 18/431,567

(22) Filed: Feb. 2, 2024

(65) Prior Publication Data

US 2025/0251457 A1    Aug. 7, 2025

(51) Int. Cl.
*G01R 31/387* (2019.01)
*G01R 31/367* (2019.01)
(Continued)

(52) U.S. Cl.
CPC ......... *G01R 31/387* (2019.01); *G01R 31/367* (2019.01); *G01R 31/3842* (2019.01);
(Continued)

(58) Field of Classification Search
CPC ............. G01R 31/387; G01R 31/367; G01R 31/3842; G01R 31/396; H01M 50/249; H01M 2220/20
See application file for complete search history.

(56) References Cited

U.S. PATENT DOCUMENTS

| | | | |
|---|---|---|---|
| 2023/0266396 A1* | 8/2023 | Wampler, II | B60L 3/12 324/426 |
| 2024/0133957 A1* | 4/2024 | Ebenezer | G01R 31/389 |

FOREIGN PATENT DOCUMENTS

WO    2023174895    9/2023

OTHER PUBLICATIONS

Xia et al., "Lithium-ion batteries State-of-charge estimation based on interactive multiple-model Extended Kalman filter," 2016 22nd International Conference on Automation and Computing (ICAC), Colchester, UK, 2016, pp. 204-207 (Year: 2016).*
(Continued)

*Primary Examiner* — Daniel R Miller
(74) *Attorney, Agent, or Firm* — Schwegman Lundberg & Woessner, P.A.

(57) ABSTRACT

Embodiments of the present disclosure relate to a method and system for estimating State-of-Charge (SoC) of a rechargeable battery, such as for example, a rechargeable battery used to power and electric vehicle (EV). In particular embodiments of the present disclosure are able to estimate SoC of rechargeable batteries that exhibit charge-discharge hysteresis on their open-circuit voltage (OCV), so that it is not necessarily instantly possible to determine state of charge from the OCV. Embodiments of the present disclosure achieve this by maintaining a measure of current supplied by (and in some embodiments voltage across) the rechargeable battery and applying the measured current (and voltage) to a predictive model that comprises a plurality of parallel time-based filters each having a different time constant ranging for example from tenths of a second to a number of seconds, minutes, or hours. The parallel filters model both the static, nominal OCV response of the battery, as well as the dynamic response, including any charge-discharge cycle voltage hysteresis, with the parallel filter models being linear in their unknowns, and hence solvable by linear regression techniques to find the necessary filter coefficient values. With such an arrangement a significantly more accurate estimation of State-of-Charge of a (vehicular) rechargeable battery is obtained than state of the art charge counting techniques.

20 Claims, 15 Drawing Sheets

(51) Int. Cl.
  *G01R 31/3842* (2019.01)
  *G01R 31/396* (2019.01)
  *H01M 50/249* (2021.01)
(52) U.S. Cl.
  CPC ........ *G01R 31/396* (2019.01); *H01M 50/249* (2021.01); *H01M 2220/20* (2013.01)

(56) References Cited

OTHER PUBLICATIONS

He et al., "An Improved Coulomb Counting Approach Based on Numerical Iteration for SOC Estimation With Real-Time Error Correction Ability," in IEEE Access, vol. 7, pp. 74274-74282, 2019 (Year: 2019).*
Su et al., "Online State of Charge Estimation of Lithium-ion Battery Cells: A Multiple Model Adaptive Estimation Approach," 2021 American Control Conference (ACC), New Orleans, LA, USA, 2021, pp. 4447-4452 (Year: 2021).*
Sadhukhan et al., Modeling and simulation of high energy density lithium-ion battery for multiple fault detection. Sci Rep. Jun. 13, 2022;12(1) (Year: 2022).*
Lyden, Colin G, "U.S. Appl. No. 63/319,460, filed Mar. 14, 2022", 79 pgs.

* cited by examiner

STATE OF CHARGE ESTIMATOR FOR BATTERIES WITH VOLTAGE HYSTERESIS

FIELD OF DISCLOSURE

This disclosure relates to providing a method and system for estimating the state of charge (SoC) of a battery with improved accuracy. In particular, it relates to a method and system for improving SOC estimation of batteries that exhibit hysteresis behavior.

Background

State-of-charge (SoC) estimation of lithium-ion batteries (LIBs) is crucial for maximizing battery performance, longevity and safety and is an essential requirement in an electric vehicle (EV) battery management system (BMS). Certain traditional and next generation composite electrode materials possess voltage hysteresis, with dependencies on past SoC values, mechanical, temperature, and ageing effects, and presents a serious challenge to conventional model based SoC algorithms.

SUMMARY

Problems can arise, however, when attempting to estimate SoC in battery chemistries which exhibit voltage hysteresis behaviour. Voltage hysteresis behaviour exists when there are different values for SoC depending on the direction of change of the open circuit voltage (Voc) (where direction of change is dependent on the battery charging up or charging down) of a battery.

There is a need to provide a more accurate method to estimate SoC in battery chemistries with voltage hysteresis and other dynamic charge-discharge behaviours, such as battery ageing, number of charge-discharge cycles, and temperature differences, by way of example.

Embodiments of the present disclosure relate to a method and system for estimating State-of-Charge (SoC) of a rechargeable battery, such as for example, a rechargeable battery used to power an electric vehicle (EV). In particular, embodiments of the present disclosure are able to estimate SoC of rechargeable batteries that exhibit charge-discharge hysteresis on their open-circuit voltage (OCV), so that it is not possible to determine state of charge from the OCV. Embodiments of the present disclosure achieve this by maintaining a measure of current supplied by (and in some embodiments voltage across) the rechargeable battery and applying the measured current (and voltage) to a predictive model that comprises a plurality of parallel time-based filters each having a different time constant ranging for example from tenths of a second to a number of seconds, minutes, hours, or even days, weeks, months, or years. The parallel filters model both the static, nominal OCV response of the battery, as well as the dynamic response, including any charge-discharge cycle voltage hysteresis as well as other dynamic factors, with the different time-constant parallel filter models being linear in their unknowns, and hence solvable by linear regression techniques to find the necessary filter coefficient values. Moreover, because the models can be solved by linear regression, it then becomes possible to solve or adapt the filter models dynamically using live data. With such an arrangement a significantly more accurate estimation of State-of-Charge of a (vehicular) rechargeable battery is obtained than state of the art charge counting (aka Coulomb counter with Kalman filter) techniques.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is an example of a battery model according to one embodiment of this disclosure.

OVERVIEW OF THE DISCLOSURE

State-of-charge (SoC) estimation of lithium-ion batteries (LIBs) is crucial for maximizing battery performance, longevity and safety and is an essential requirement in an electric vehicle (EV) battery management system (BMS). Certain traditional and next generation composite electrode materials possess voltage hysteresis, with dependencies on past SoC values, mechanical, temperature, and ageing effects, and presents a serious challenge to conventional model based SoC algorithms. Herein we present a novel approach to improve SOC estimation of LIBs that exhibit this hysteresis behavior. In contrast to traditional approaches, the battery model is formulated to be linear in its parameters which allows a recursive linear regression solver, such as a Kalman Filter (KF), to adapt the parameters online. The SoC estimator is coupled to an online recursive capacity estimator to track out uncertainty due to fading of the capacity as the battery ages. The performance and robustness of the proposed approach for a silicon-graphite anode LIB is verified against a standard model-based approach via experimental data. The results show that the proposed algorithm can significantly improve SoC estimation under different load profiles, initial SOC errors, capacity estimation errors, temperature, and cell-cell variation.

Figure 8:
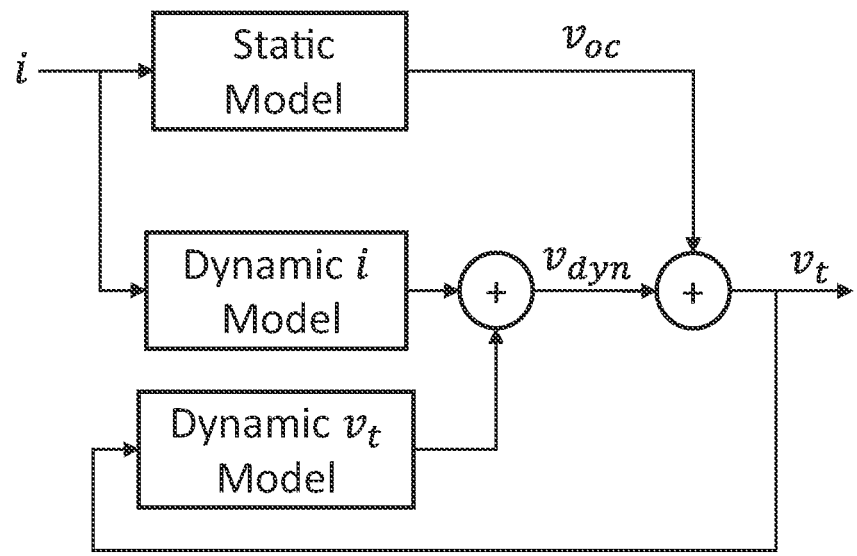
FIG. 8 is a block diagram of an overview of the SoC estimator model on which embodiments are based.
Figure 9:
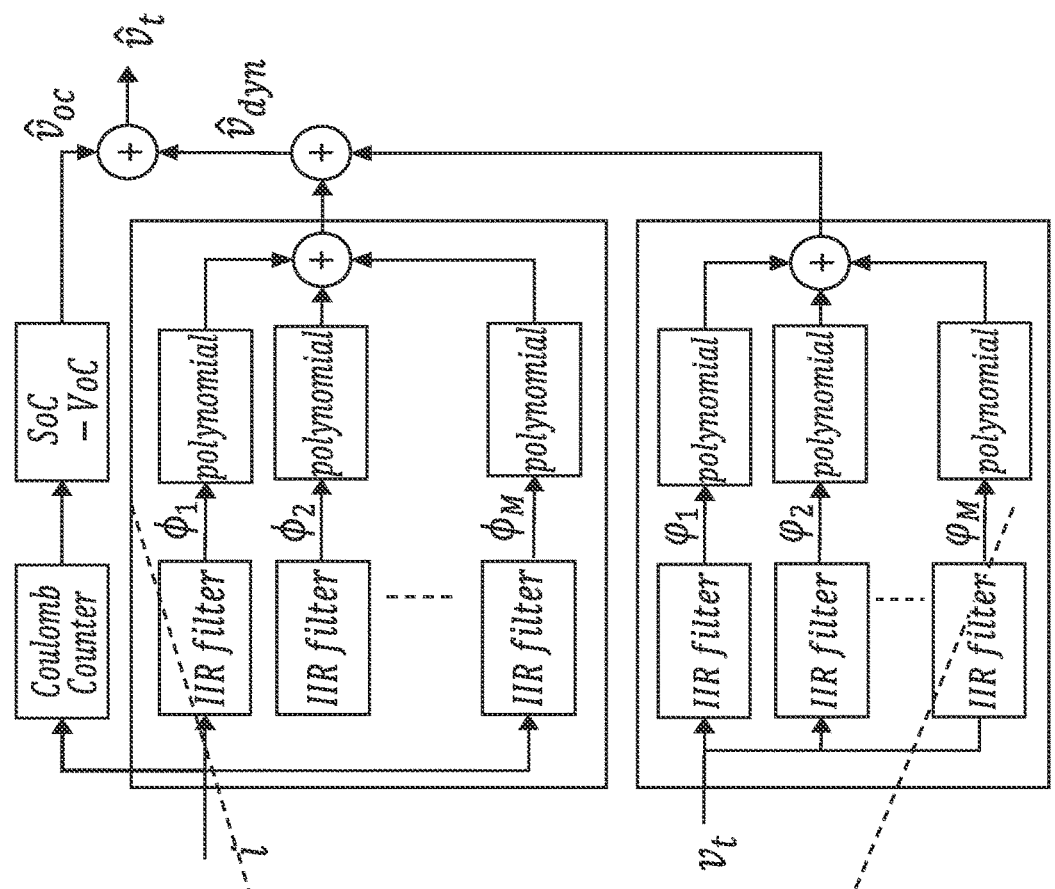
FIG. 9 is a block diagram illustrating the arrangement of the battery model used in embodiments of the disclosure.
Figure 9:
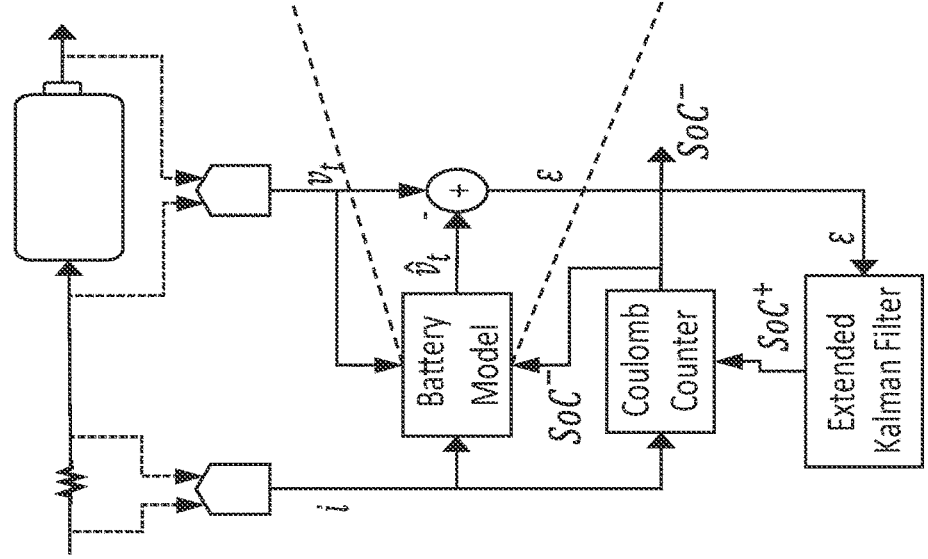

FIG. 8 illustrates a high level model of the approach described herein to model the battery. As shown in FIG. 8, the battery model used in embodiments of the present disclosure comprises a static model which represents the hysteresis-free DC response of the battery and is typically a state-of-charge open circuit voltage model, and a dynamic model, which is linear in the unknowns, and which models the hysteresis response of the battery as it charges and discharges. The dynamic model takes as its input both current through the battery i, and measured terminal voltage $v_t$ across the battery and estimates an output terminal voltage, $\hat{v}_t$. As then shown in FIG. 9, this improved battery model is then applied to generate an estimated terminal voltage that takes into account both the static behaviour of the battery and the dynamic, hysteresis-driven, behaviour of the battery as it charges and discharges to give the estimated voltage $\hat{v}_t$, which is then compared to the measured voltage and hence closes a loop around a Coulomb counter via an Extended Kalman Filter[2] (EKF) estimator to produce a corrected SoC estimation, $\hat{SoC}^+$.

With respect to the battery model itself, as noted above this has two main components, a static component which is the open-circuit voltage state of charge model, and then a dynamic component, which models both the terminal voltage across the battery and the current through the battery separately. Both the models for the dynamic terminal voltage $\hat{v}_t$ and dynamic current i comprise a respective bank of parallel IIR filters with each of the IIR filters having a different filter time constant prechosen to span over multiple time scales from second to days (or even weeks or months). There will be several parallel IIR filters in each bank, for example from 4 to 6, up to perhaps 10 or more, with the time constants for each chosen accordingly to cover both short and long time periods, with, for example, up to a factor of 1000 difference between the longest and shortest filter time constants in a filter bank. The output of the filters is a dynamic prediction of the battery voltage which can be combined with the static open circuit prediction to give a dynamic terminal voltage $\hat{v}_t$ which is then used with the Coulomb counter and EKF to provide the improved state-of-charge estimate.

In tests of the system on a specific set of test cells provided by a customer, with IIR current and voltage filter banks consisting of 20 1st order IIR filters with time constants logarithmically spaced from 10 s to 100 hr with a sample period of 10 s and a polynomial order of 2, the algorithm satisfied a customer specification of maintaining the SoC accuracy to better than 2%.

DETAILED DESCRIPTION

Background

As mentioned above, problems can arise, however, when attempting to estimate SoC in battery chemistries which exhibit voltage hysteresis behaviour.

This disclosure provides an improved method and system to estimate SoC in battery chemistries with voltage hysteresis behaviour.

The SoC of a rechargeable battery cannot be measured directly but must be estimated from measurable quantities such as current, voltage, temperature, and impedance. The fundamental relationship between the current, i and SoC at any time instance t, is $$SoC(t) = SoC(0) + 1/Q \int_0^t i(\tau)d\tau \qquad \text{(Eq. 1)}$$

Equation 1 can be used as the basis for an SoC estimator based on a Coulomb Counter approach. Here Q is the capacity of the battery in (AmpSeconds (As)) and SoC(O) is the initial SoC of the battery. Due to errors in measuring the current, estimating the initial SoC and the estimate of the capacity of the battery, this so-called "Coulomb-Counter" approach performs poorly in practice and requires some form of closed loop correction.

Figure 1:
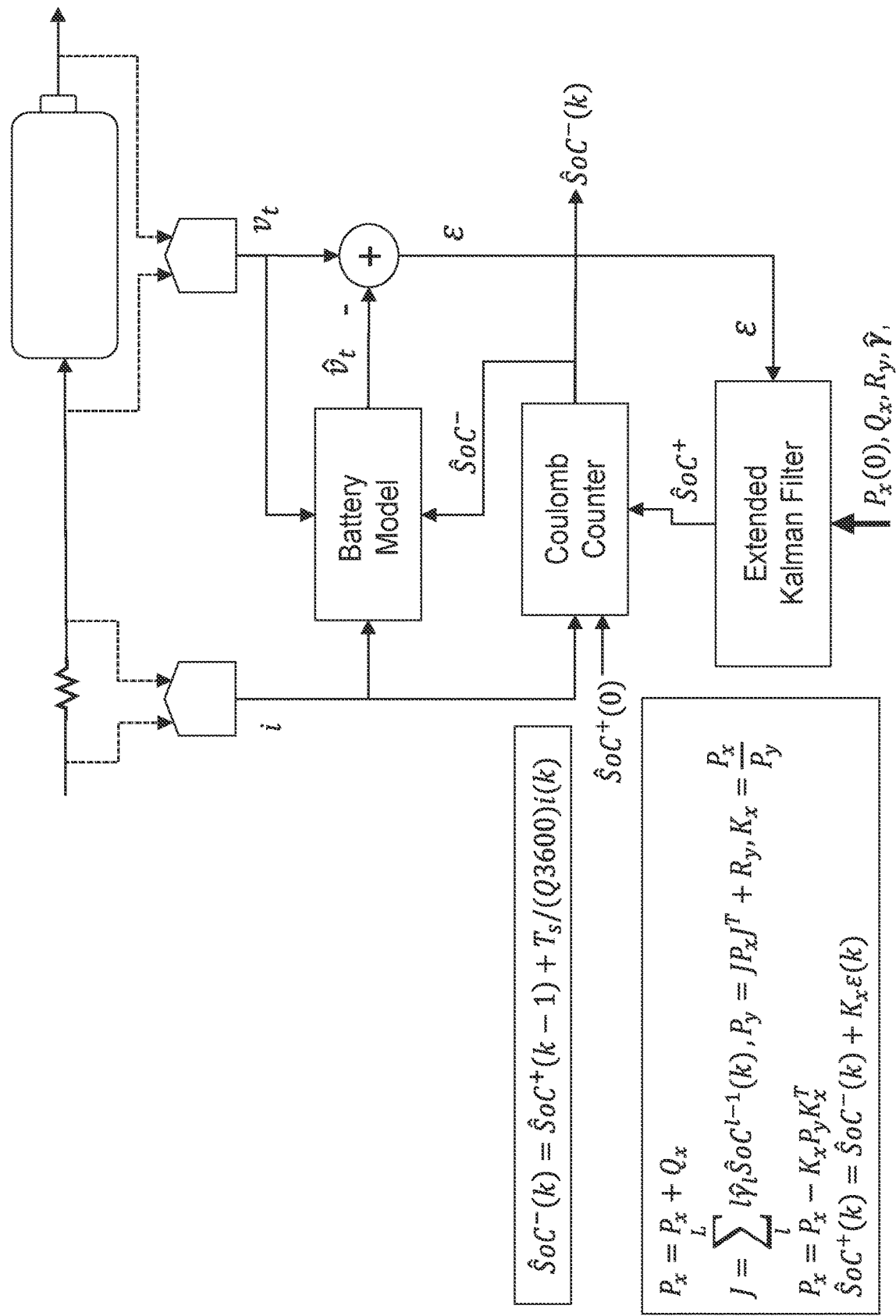
FIG. 1 is an example of a model of an SoC estimator.

A model based Kalman filter can be used to complement the Coulomb Counting approach. As shown in FIG. 1 a behavioral model of the battery dynamics takes the current, i and estimated SoC, $\hat{SoC}(k)$ as input variables and estimates the output terminal voltage, $\hat{v}_t$. The estimated voltage is then compared to the measured voltage $v_t$ and hence closes a loop around the Coulomb-Counter via an Extended Kalman Filter (EKF) estimator to produce a corrected SoC estimation, $\hat{So}(k-1)$.

Figure 2:
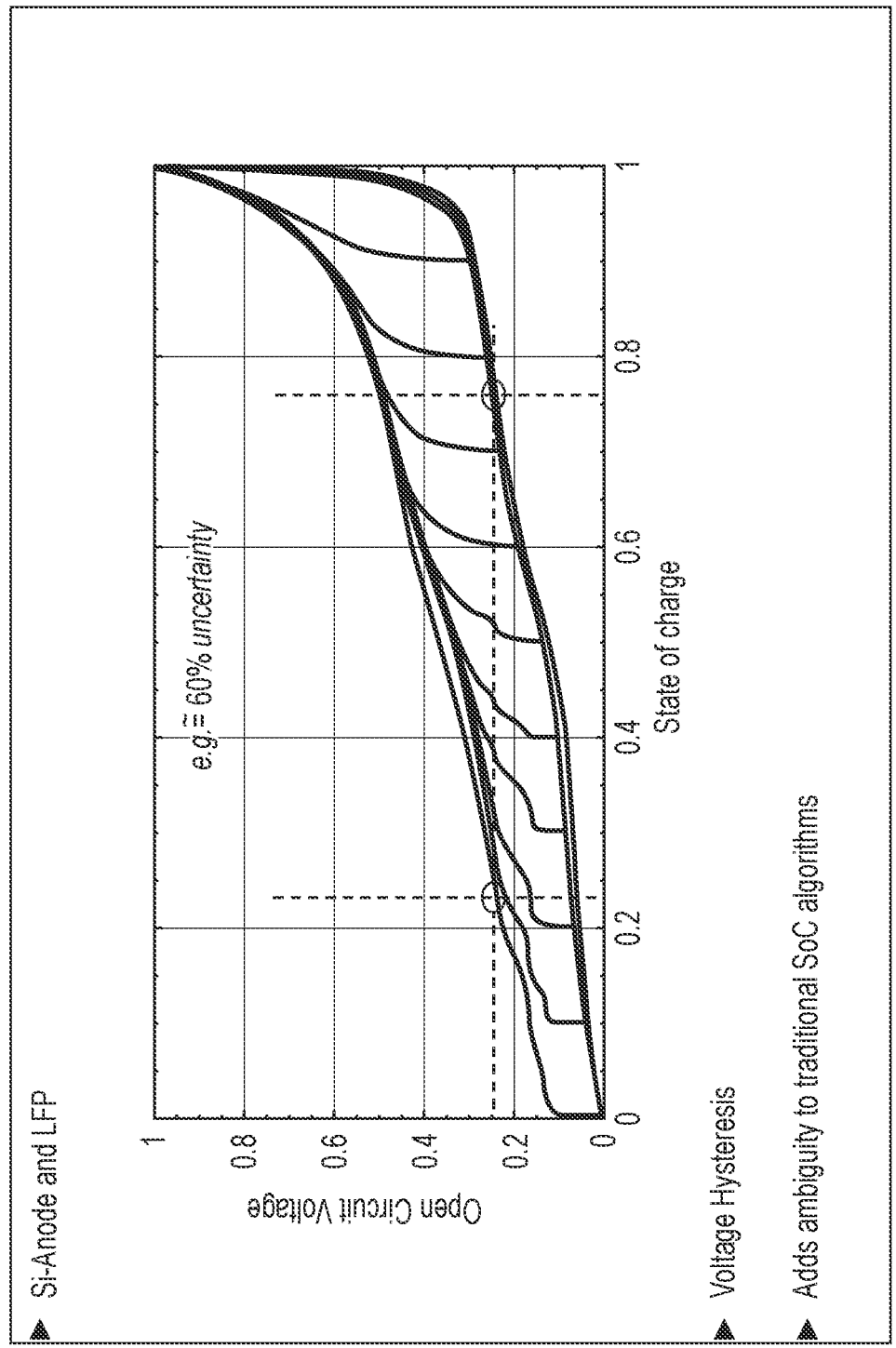
FIG. 2 is an example of a voltage hysteresis behaviour in a battery.

The performance of this approach is critically dependent on the accuracy of the battery model. In certain battery chemistries for example, in Lithium-ion batteries (LIBs), the input-output dynamics are nonlinear, time-varying, temperature-varying, load-varying and SoC-varying. The modelling challenge is further exacerbated in emerging chemistries such as Si-anode and Lithium Iron Phosphate (LFP) that possess strong voltage hysteresis. FIG. 2 shows an example of voltage hysteresis in Si-anode and LFP batteries, from which it can be seen that for charge and discharge cycles the measured open circuit voltage of the battery can indicate a very different actual state of charge for the same indicated open circuit voltage, with in some cases as much as ~60% uncertainty of the actual state of charge.

Figure 3:
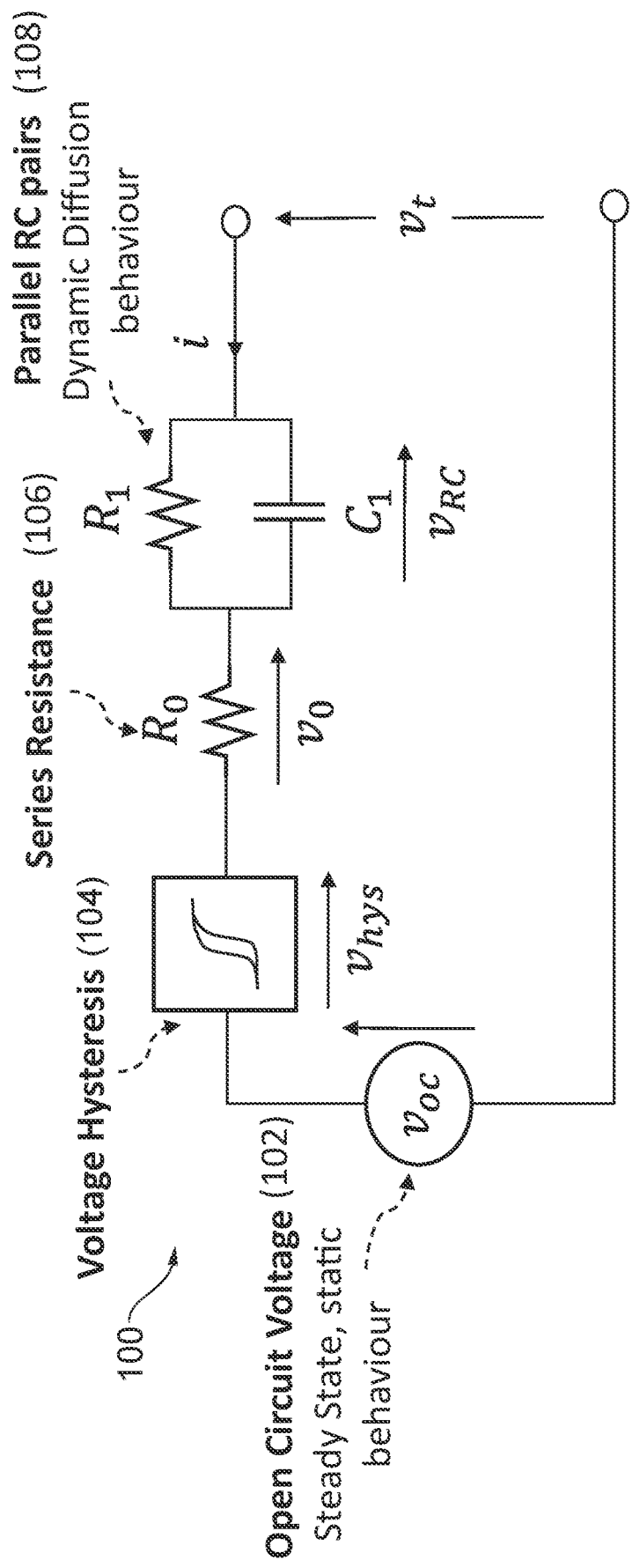
FIG. 3 is a comparative battery model for the SoC estimator of FIG. 1

FIG. 3 shows an example of a comparative battery model 100 which can be used in the SoC estimator of FIG. 1. The comparative battery model accounts for the open circuit voltage 102, voltage hysteresis 104, series resistance 106 (included to measure current flowing through the battery), $v_t$ which is the measured terminal voltage of the battery and one or more resistor-capacitor (RC) pairs 108 to model dynamic diffusion behaviour of the battery. However, the comparative battery model has several drawbacks in that it is non-linear in the model parameters (for example for Ro, R1, C1) and a non-convex optimizer is required to fit the model. As a result, the training and adaptation of the comparative battery model 100 is complex and expensive.

The inventors have proposed an improved battery model which is simpler and provides a more accurate estimation of SoC.

Modelling Static and Dynamic State-of-Charge

Figure 4:
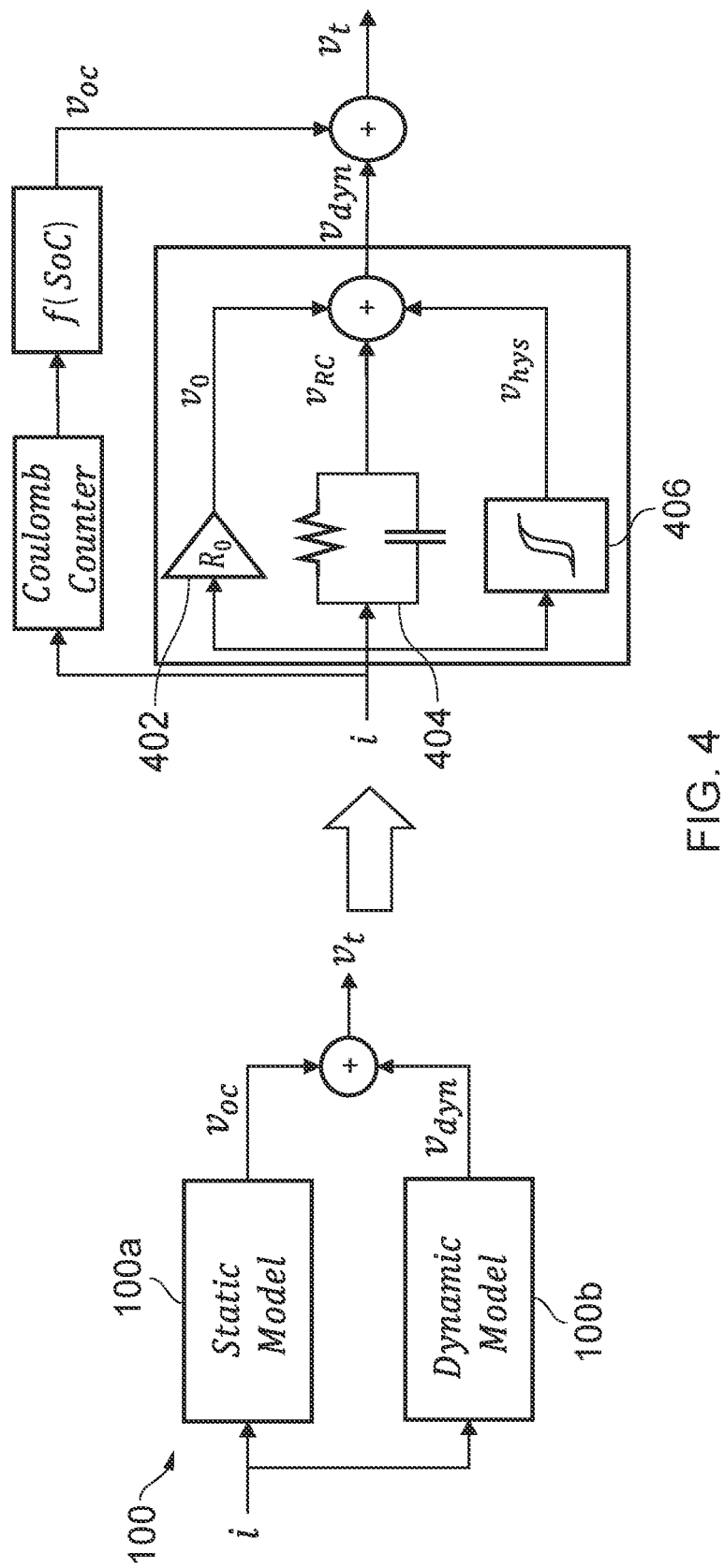
FIG. 4 is an example of a battery model according to another embodiment of this disclosure. (with voltage)

Firstly, as shown in FIG. 4, the inventors have recognized that the battery model 100 can be represented as comprising a static model 100a to model the steady state response of the battery and a dynamic model 100b to model the dynamic response of the battery. Current load i is the system input and terminal voltage, $v_t$ is the output. Given the static model 100a and the dynamic model 100b, the output of the battery model can be respectively decomposed into steady state $v_{oc}$ and dynamic, $v_{dyn}$, responses. The steady state response is a function of the SoC, that is $$v_{oc} = f(SoC) \qquad \text{(Equation 2)}$$

whereas the dynamic model is made up conceptually of a resistance $R_0$ (402), giving $v_0$, parallel RC circuit (404) giving $v_{RC}$ and hysteresis (406), giving signal $v_{hys}$. As noted earlier there can be one or more RC circuits, but for the sake of simplicity, FIG. 4 only shows one parallel RC circuit.

Figure 5A:
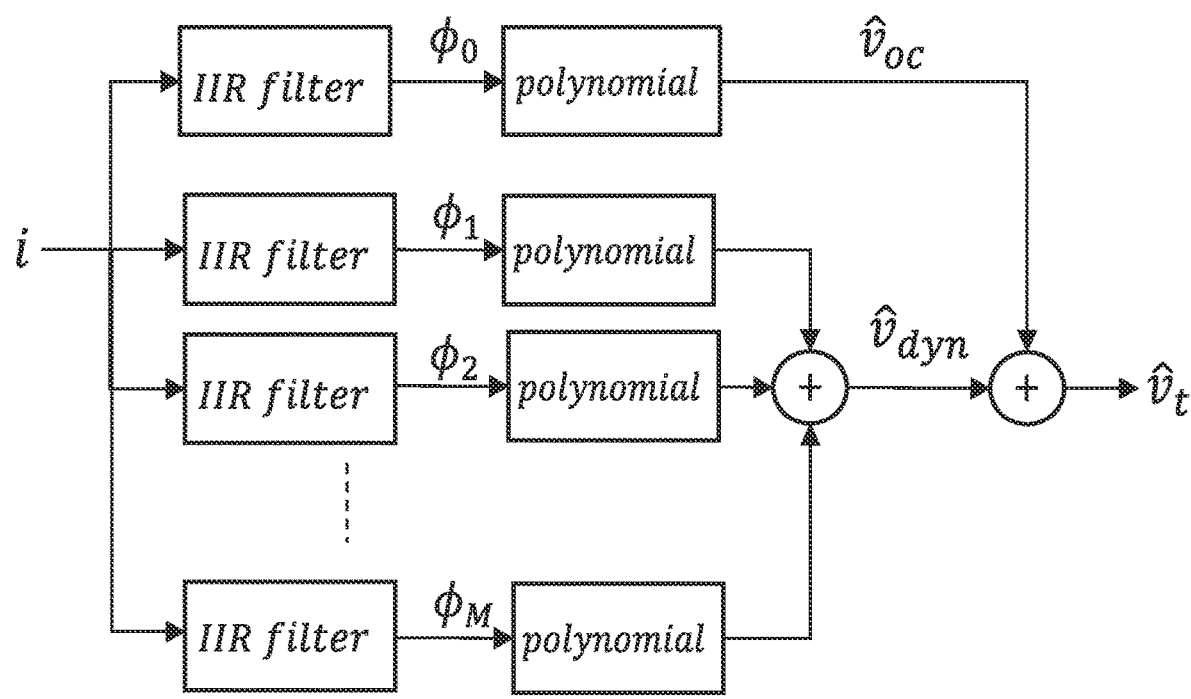
FIGS. 5a and 5b is an example of an SoC estimator according to an embodiment of this disclosure.

In view of the above recognition, the inventors have further realized that both the static model and dynamic model segments of FIG. 4 can be implemented using a bank of parallel infinite impulse response (IIR) filters. This improved model having the bank of parallel IIR filters is shown in FIG. 5a. The bank of parallel IIR filters captures the multi-timescale diffusion current and hysteresis behaviour of a battery. As seen in FIG. 5a, the measured current i is fed into a bank of IIR filters to generate a set of virtual battery current states, $\phi_m(k)$, where $$\phi_m(k) = a_m \phi_m(k-1) + b_m(k) \quad \text{(Equation 3)}$$

where $b_m$ is a scalar gain constant and given by $b_m = 1 - a_m$.

The poles of the time-based filters, $$a_m = e^{-\frac{T_s}{\tau_m}}$$

are set by selecting the time constant $\tau_m$ which can span multi-timescales from seconds, to hours, to days, even weeks. $T_s$ is the sampling period. The dynamic model comprises a current states model which generates current states, $\phi_m(k)$ which in turn are expanded through respective polynomials (with each state having its own polynomial) and combined to model the dynamic voltage response of the battery $\hat{v}_{dyn}$. The dynamic voltage response of the battery, $\hat{v}_{dyn}$, is then added to the static open-circuit voltage, $\hat{v}_{oc}$ to give the overall estimate of the battery terminal voltage, $\hat{v}_t$. The static open-circuit voltage, $\hat{v}_{oc}$ is estimated by mapping the SoC estimated, $\phi_o$ given by $$\phi_0(k) = \phi_0(k-1) + \frac{T_s}{Q} i(k), \quad \text{(Equation 4)}$$

Equation 4 is a specific case of the general Equation 3 with $a_0 = 1$ and $$b_0 = \frac{T_s}{Q}$$

with Q in units of amps (As).

The dynamic model as implemented in FIG. 5a captures diffusion and hysteresis behaviour in the battery. By modelling the dynamic voltage response via the bank of IIR filters, the model is linear in the unknowns (i.e., the polynomial coefficients), is convex and hence can be found using Linear Regression. The inventors have recognized that for the model of FIG. 5a, a batch based regularized Least Squares algorithm can be used to fit a generalized model offline and then a Kalman Filter can be used to adaptively update this model online. This formulation provides a major advantage over the traditional approach of battery model fitting, where the problem is nonconvex and proves difficult to adapt online. In other examples which would fall within the present disclosure, any of many other recursive-like estimation algorithms may be used. Another example would be the Recursive Least Squares (RLS) and its many variants.

With respect to a specific example for the time constant, and the sampling period, in one example implementation the current and voltage filter banks consisted of 20 1st order IIR filters with time constants logarithmically spaced from shortest duration of 10 s to a longest duration of 100 hr in length with a sample period of 10 s and a polynomial order of 2. Further details about how these time constants can be selected for use in embodiments of the disclosure are given below.

As a first point, it should be noted that in practice the modelling approach is quite flexible and forgiving in that in one example it is possible by trial and error to find a range (min to max) of values for the time constants. For example, when presented with a fresh set of battery drive cycle input current and output data, a set of filter time constants may be found using the following process:

1. Start with a lower and upper time constant (e.g., seconds to 100 s of hours) limit chosen heuristically. For example, one might select a lower time constant of 1 second, and an upper time constant of 1000 hours (3600000 seconds) as upper and lower bounds.
2. Take 10 current and voltage states (i.e., 10 IIR filters for current and voltage states)
3. Logarithmically space the 10 time constants from the lower to upper limit.
4. Choose an order for the nonlinear (polynomial) term; in practice this is either 1st, 2nd, . . . , <=5th order. It is rarely necessary to go above a $5^{th}$ order polynomial as the model would tend to become ill-conditioned and too expensive to implement.
5. Fit a model and record the accuracy (e.g., rms error between measured voltage and estimated voltage).

Next, the above steps are repeated, but changing the lower limits of time constants, e.g., sub seconds, 10 seconds, 100 seconds and repeating the above, redistributing 10 intermediate time constants between the changed lower limit and the upper limit each time. Then, repeat the steps again but change the upper limit, e.g. into hours, 10 s of hours, 100 hours, 1000 hours, for example. Then repeat again for different orders of nonlinearity and finally repeat again for different numbers of time constants. From this process, one can begin to converge in on a suitable model configuration. The strength of the modelling method is that it is not sensitive to this model 'hyperparameter' configuration.

The above therefore represents a heuristically guided, trial and error, style approach to the finding of the time constants, which requires multiple model fittings and then finding the accuracy of the model in order to converge on a suitable set of time constants.

A more systematic approach is to use an optimizer to search automatically for a configuration. Here another, offline (computer or cloud based) algorithm automatically varies the time constants lower and upper limits, fits a model, calculates the rms error and then adjusts these limits until it finds a minimum (of the rms error). Effectively, such an approach automates and systematizes the above described heuristic approach, but allows for a brute force approach to finding the set of time constants. One needs to be mindful of finding local minima of the rms error, but if the distribution remains essentially logarithmic between the upper and lower limits, then a large number of possible solutions (different upper and lower limits, different numbers of time constants and different orders of non-linearity) can be tested across the whole model space to find the minimum error.

Figure 14:
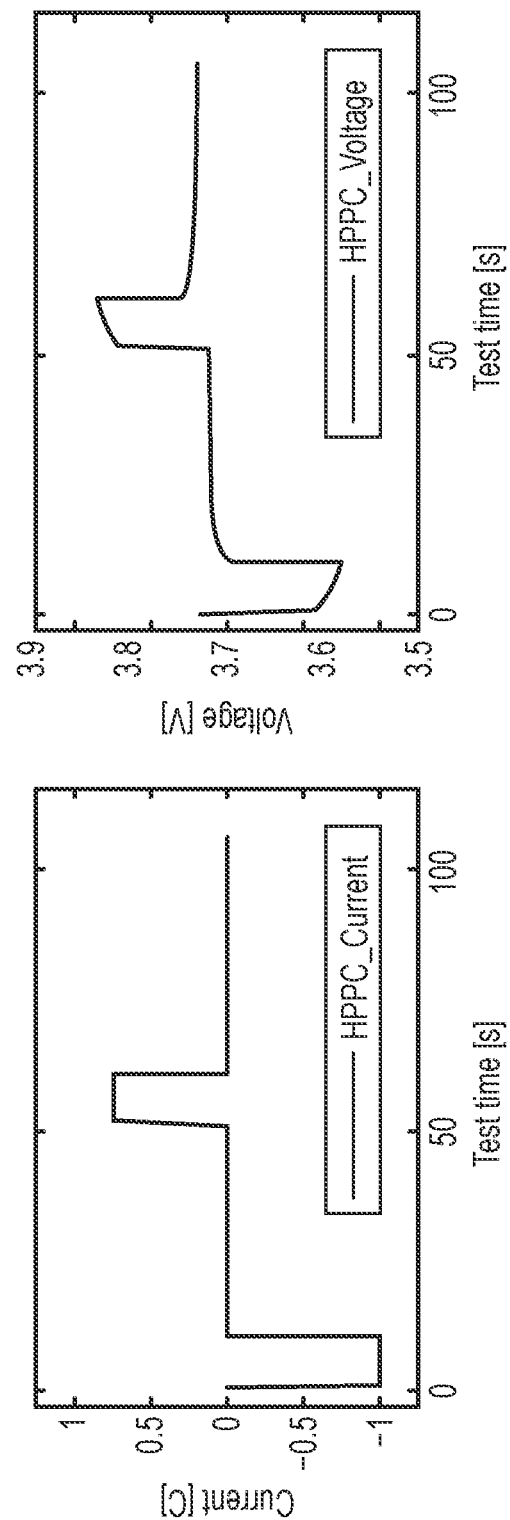
FIG. 14 is set of graphs explaining how time constants may be set in one example of the present disclosure.

A third approach is to stimulate the battery with a current pulse and record the voltage response. An example is shown in FIG. 14, where the left hand plot shows the current response, and the right hand plot shows the voltage response. From the voltage response, it is possible to estimate a suitable range for the time constants. In the plots in FIG. 14, the time constants would be in the order of ~1 s to ~100 s, because as shown in the plots that is the time period over which the battery response settles in response to the stimulating pulse. This pulse test is carried out over the full range of the battery, from 100% to 0% SoC as it discharges, and again from 0% SoC to 100% Soc as it is charged in steps for, e.g., 5%. Such a test is referred to in the art as the Hybrid Pulse Power Characteristic (HPPC) test. As the battery transitions from 100% to 0% and then back again up to 100%, the time constants would typically be expected to vary (i.e., are a function of SoC). Similarly, the time constants would be expected to vary with temperature and with ageing. In our modelling approach, we need to identify what the widest spread of time constants are across all these conditions (SoC, temperature and ageing), ensure we have the lower and upper limits. By performing the HPPC tests across all the conditions then the upper and lower limits of the time constants can be found.

Whilst the HPPC test approach therefore provides an empirical approach to finding the time constants, the number of actual tests required may be prohibitive to actually performing the approach in practice within a suitable time period, and particularly if battery ageing is to be taking into account. However, the HPPC test approach is amenable to combination with the heuristic approach described above so that only a subset of possible tests are performed across the test space, and the time constants then found from those results. As noted above, the model is not hyper-sensitive to exact model parameters needing to be found.

Figure 5B:
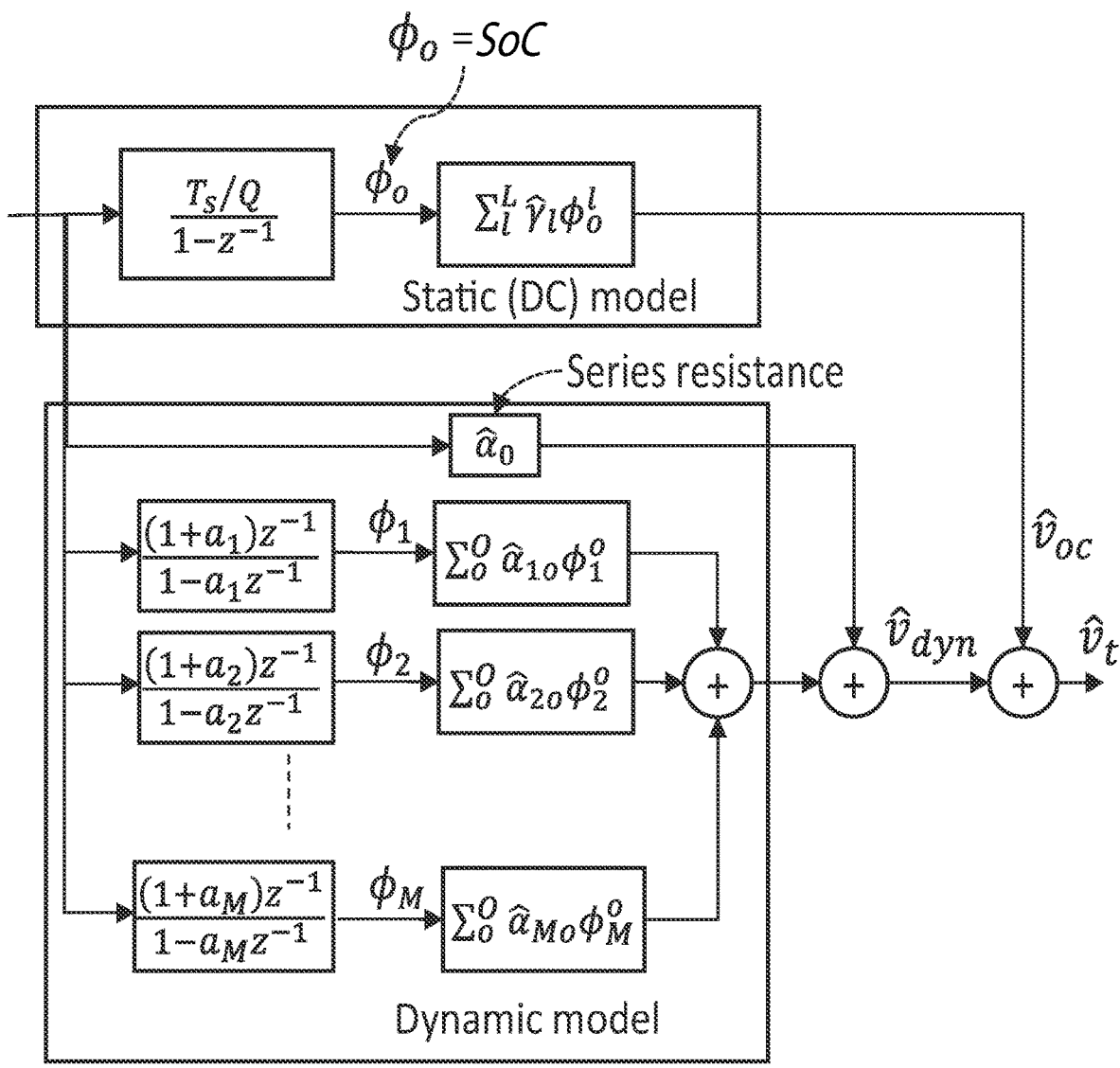

FIG. 5b shows the battery model of FIG. 5a with details of the filters and polynomials included. As can be seen in FIG. 5b, a Z-transform is applied to the IIR filter equations as shown in FIG. 5a which are used to generate the respective current states. The coefficients or poles of the IIR filters are fixed (see the derivation of the poles of the IIR filters as described above). The model is trained and adapted by fitting the coefficients of the polynomials $\hat{\gamma}_k$ and $\hat{\alpha}_k$ (where k is the sample time index). As mentioned above, the model is linear in the unknowns, $\hat{\gamma}_k$ and $\hat{\alpha}_k$ and is convex, thereby enabling linear regression to be used for fitting and adapting the model.

Figure 6:
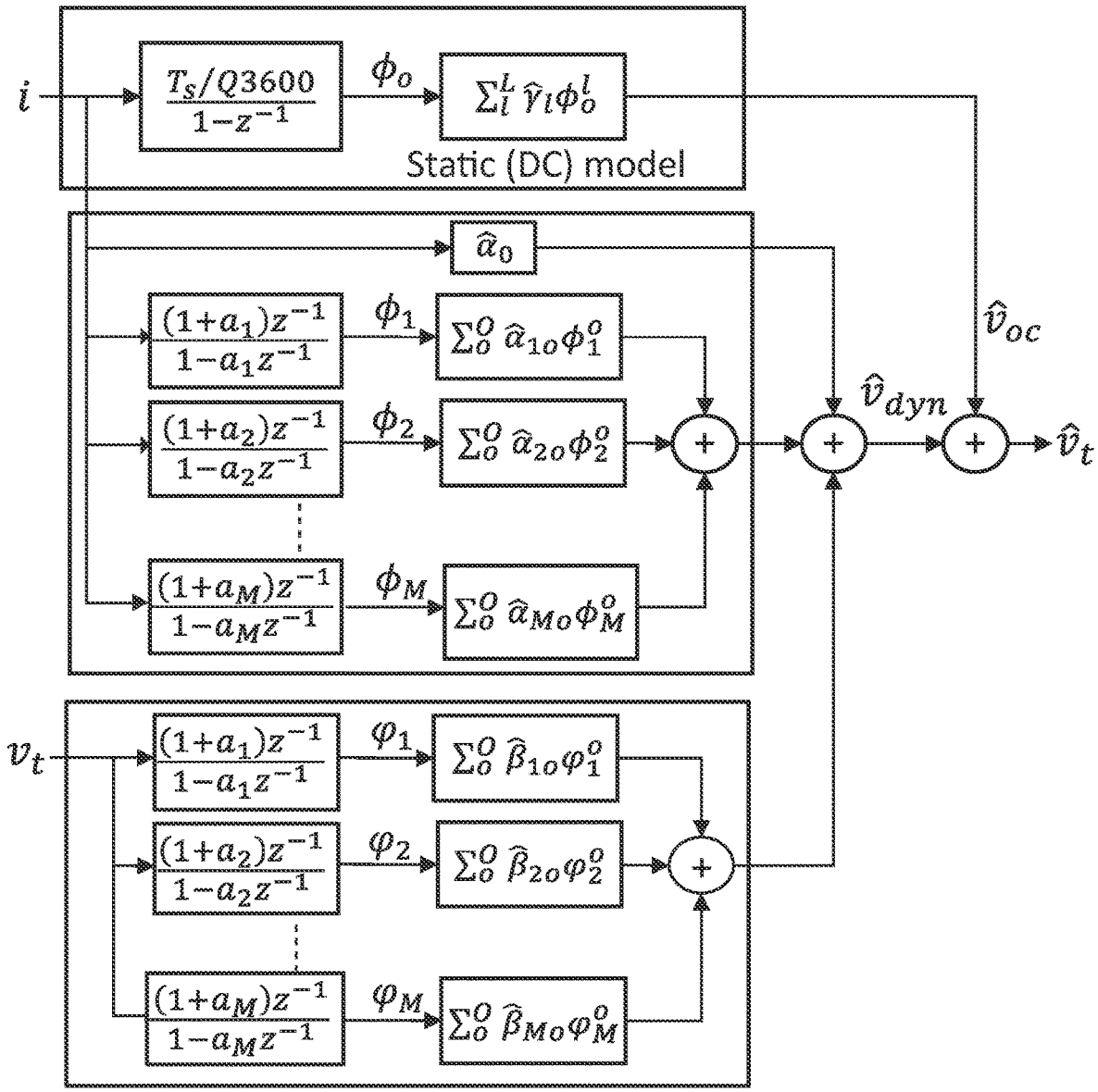
FIG. 6 is an example of an SoC estimator according to another embodiment of this disclosure.

FIG. 6 shows another embodiment of a battery model according to this disclosure. The battery model of FIG. 6 includes the model of FIG. 5b and additionally includes a voltage states model as part of the dynamic model, where the voltage states model receives the measured terminal voltage, $v_t$ as input and generates a set of virtual battery voltage states, φ. The voltage states model is similar to the current states model in FIG. 5a which generates the virtual battery current states, φ in that the voltage states model also comprises a bank of parallel IIR filters and in that the respective virtual voltage states, φ are expanded through a respective polynomial and combined together with the output from the current states model to model the dynamic voltage response of the battery, $\hat{v}_{dyn}$. The embodiment in FIG. 6 shows the same IIR filters being used for the voltage states model and the current states model. In other embodiments, the IIR filters being used for the voltage states model can be different to the current states model. For example, there can be a different number of current states to voltage states (e.g. 10 current states, 5 voltage states). The time constants for the current states can be different to those used in the voltage states.

As in the case of the model in FIG. 5b, the model in FIG. 6 is linear in the unknowns $\hat{\gamma}_k$, $\hat{\alpha}_k$ and $\hat{\beta}_k$ (where k is the estimator sample rate index). and is convex, thereby enabling linear regression to be used for fitting and adapting the model.

The inventors have found that the incorporation of the voltage states model as in FIG. 6 further improves the accuracy of the battery model (when compared to the model in FIG. 5b)

State-of-Charge Estimator: First Embodiment

Figure 7:
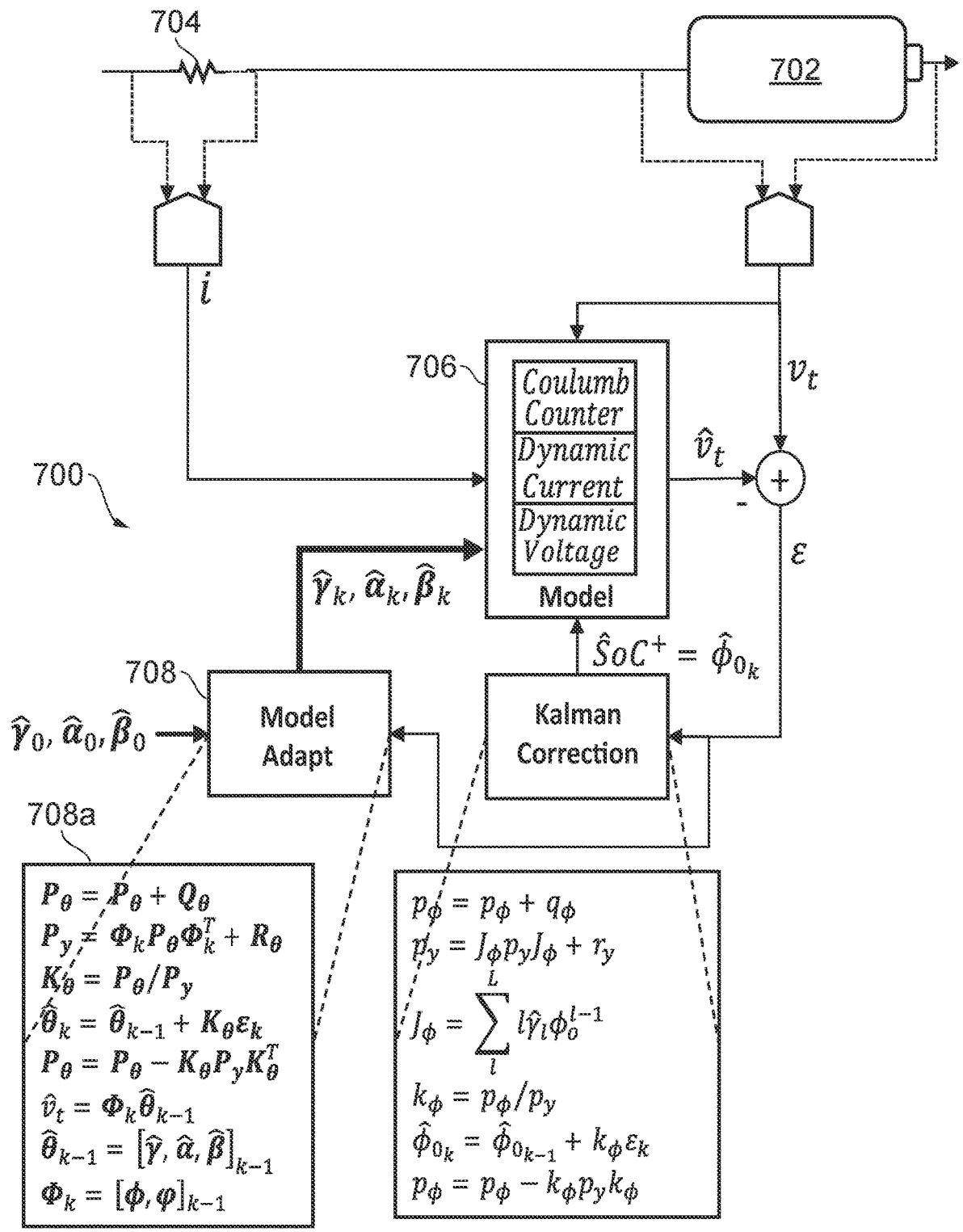
FIG. 7 is a block diagram of a SoC estimator arrangement according to a further embodiment of the disclosure.

FIG. 7 shows an SoC estimator 700 according to a first embodiment of this invention. The SoC estimator 700 is configured to measure a current, i, into the battery 702 via a series resistance 704. In some embodiments, the SoC estimator may also be optionally further configured to measure a terminal (or cell) voltage $v_t$ across the battery 702. The measured current, i and terminal voltage, $v_t$ (if measured) are input into the battery model 706. The battery model 706 includes a battery model according to an embodiment of this disclosure as described above in FIG. 5b or FIG. 6 (if terminal voltage, $v_t$, is also measured). That is, it includes a static model 706a to model the steady state response of the battery and a dynamic model 706b to model the dynamic response of the battery—the dynamic model in turn comprises the current states model 706b(i) and optionally comprises the voltage states model 706b(ii).

The coefficients for the bank of IIR filters in the dynamic model part of the battery model 706 are fixed as described above with respect to FIG. 5b and FIG. 6. For the bank of polynomials in the battery model 706, a polynomial coefficient generation model 708 is used to generate the polynomial coefficients, $\hat{\gamma}_k$, $\hat{\alpha}_k$ and $\hat{\beta}_k$. The polynomial coefficient generation model 708 receives as input: predetermined initial values of $\hat{\gamma}_o$, $\hat{\alpha}_o$ and $\hat{\beta}_o$, for the polynomial coefficients and an error E based on a difference between the measured terminal voltage, $v_t$ and the predicted terminal voltage $\hat{v}_t$ output by the battery model 706. The predetermined initial values of $\hat{\gamma}_o$, $\hat{\alpha}_o$ and $\hat{\beta}_o$ are used as an initial state for the coefficient generation model 708 so that as the battery performance changes over time, due to age, temperature variations etc, the model 708 can be used to adapt the polynomial coefficients accordingly.

The predetermined initial values of $\hat{\gamma}_o$, $\hat{\alpha}_o$ and $\hat{\beta}_o$, can be initially found using a batch base Least Squares (or any one of many batch based Linear Regression solvers). A vector of input current and output cell voltage would be collected over a testing time period (which may be many hours), and a linear system of equations is then set up corresponding to the model fit problem and solved to give these initial parameters.

In one embodiment, a Kalman filter can be used to generate the polynomial coefficients $\hat{\gamma}_k$, $\hat{\alpha}_k$ and $\hat{\beta}_k$. In some other embodiments, other suitable algorithms such as least squares, least mean squares or Recursive Least Squares etc can be used to generate the polynomial coefficients. Block 708a in FIG. 7 shows the details of a Kalman filter used to generate the polynomial coefficients $\hat{\gamma}_k$, $\hat{\alpha}_k$ and $\hat{\beta}_k$. We will now briefly explain the equations in Block 708*a* which are used to generate the said polynomial coefficients.

$$\hat{\theta}_{k-1} = [\hat{\gamma}, \hat{\alpha}, \hat{\beta}]_{k-1} \quad \text{(Equation 5)}$$

$$\hat{\theta}_k = \hat{\theta}_{k-1} + K_\theta \varepsilon_k \quad \text{(Equation 6)}$$

Equation 5 describes a vector, $\hat{\theta}_{k-1}$ of the unknowns (i.e. the polynomial coefficients $\hat{\gamma}_k$, $\hat{\alpha}_k$ and $\hat{\beta}_k$. Equation 6 describes the Kalman equation, where the error $\varepsilon_k$ used to correct and train the vector $\hat{\theta}_{k-1}$. That is, as seen in equation 6, a vector $\hat{\theta}_k$ is defined which is equal to the vector, $\hat{\theta}_{k-1}$ as defined in Equation 5 (for instance, at the start of the algorithm, $\hat{\theta}_{k-1}$, could be the vector comprising a predetermined initial value of the polynomial coefficients at time=0 s, i.e., $\hat{\theta}_0$, =$[\hat{\gamma}_o, \hat{\alpha}_o, \hat{\beta}_o]$. $\varepsilon_k$ is the error between the estimated terminal voltage, $\hat{v}_t$ output by the battery model 706 and the measured terminal voltage, $v_t$, across the battery 702. $K_\theta$ is the Kalman gain which in turn is derived based on the equations as shown in block 708*a*. $P_\theta(0)$, $Q_\theta$, $R_\theta$ are tuning parameters set by the user based on the confidence in the initial estimate values for the polynomial coefficients, noise in the system, uncertainty in measured terminal voltage $v_t$ and measured current i etc.

State-of-Charge Estimator

Figure 10:
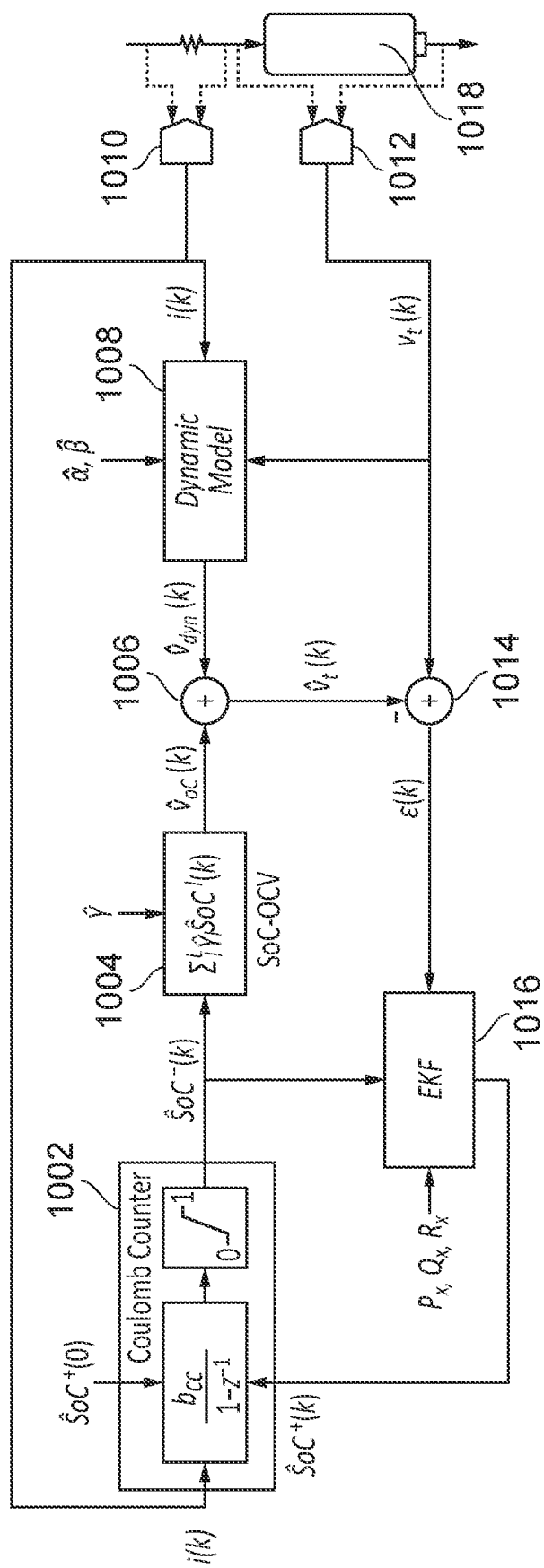
FIG. 10 is a block diagram of an SoC estimator according to another embodiment of this disclosure.

FIG. 10 shows the State-of-Charge Estimator. This is closely related to the first embodiment described above, and uses the same dynamic model as described previously. The below provides further details as to how the different elements of the invention are connected together.

Reviewing first the structure of the estimator, battery 1018 is provided with current measurement block 1010 comprising a resistor in series with the battery provided to permit measurement of current i(k) through the battery, and voltage measurement block 1012 provided to measure $v_t(k)$ across the battery. Current i(k) is fed to a coulomb counter 1002, which keeps a count of the amount of electrical charge that the battery has provided by integrating the current i(k) over time, to provide a charge or coulomb count SoC⁻(k) that is input into a static open circuit voltage state-of-charge estimator 1004. The estimator 1004 applies the static (DC) model to the charge count to provide an open circuit estimate of the voltage $\hat{v}_{oc}(k)$ that the battery should now be producing at time k, given the starting conditions for the battery and the charge count measured by the coulomb counter. This open circuit estimate $\hat{v}_{oc}(k)$ is fed to a summing block 1006. In addition, the charge count SoC⁻(k) is also fed to an extended Kalman filter 1016. The model parameter $\hat{\gamma}$ on start-up takes a baseline value from a generalized model, as will be explained later, and can be adapted by model adaptation in dependence on the measured voltage and current measurements from the battery.

Thus far, therefore, an estimate of open circuit voltage of the battery based on static conditions without taking into account the battery hysteresis and dynamic response has been found. It is therefore also necessary to provide a dynamic estimation taking into account the hysteresis model and dynamic response, and this is performed by the dynamic model 1008, which also receives current measurement i(k) from block 1010. The dynamic model is as described previously with respect to FIG. 5*b* or 6*a* above, and provides an estimate of $\hat{v}_{dyn}(k)$ that is fed to summer block 1006, where is it added to $\hat{v}_{oc}(k)$ to obtain $\hat{v}_t(k)$, an estimate of the voltage the battery should be producing taking into account both the static conditions as measured by the coulomb counter, and the dynamic hysteresis conditions of the charge-discharge cycle of the battery.

$\hat{v}_t(k)$ is then subtracted from the actual measured battery voltage $v_t(k)$ as measured by battery voltage measurement block 1012, by a subtractor 1014, to give an error signal $\varepsilon(k)$ representative of the difference between the actual measured battery voltage $v_t(k)$ and the predicted or estimated battery voltage $\hat{v}_t(k)$ obtained from the static and dynamic model. This error signal $\varepsilon(k)$ is then used as an input, together with the State-of Charge calculation $\hat{S}oC^-(k)$, into a extended Kalman filter, which then calculates an updated State-of Charge value $\hat{S}oC^+(k)$ which is then used to update the Coulomb counter to the updated value. Thus, the state of charge measurement as counted by the coulomb counter 1002 is repeatedly updated via the static and dynamic model generating a predicted voltage from the battery and comparing it with the measured voltage to provide an error signal that in turns drives a Kalman filter update to generate a more accurate state of charge measurement. In this way embodiments of the present disclosure provide for more accurate state of charge measurements by the updating of the Coulomb counter via the Kalman filter in dependence on the error $\varepsilon(k)$ as determined using the static and dynamic predictive filters 1004 and 1008.

Figure 11:
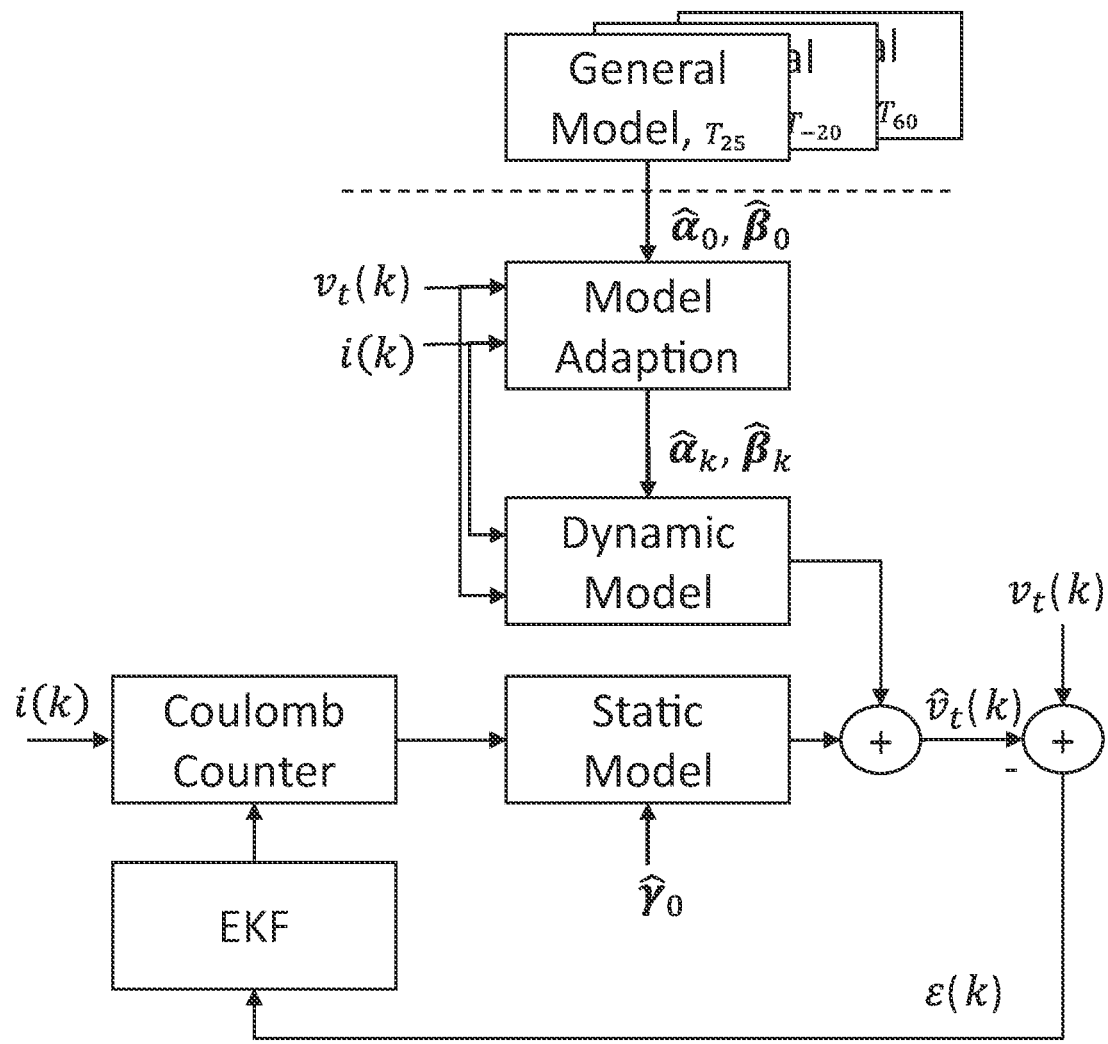
FIG. 11 is a block diagram illustrating the initial conditions for the SoC estimator of FIG. 10, and how the parameters thereof are adapted.

FIG. 11 shows a generalised procedure for adaptation of the model parameters $\hat{\alpha}_k$, $\hat{\beta}_k$, $\hat{\gamma}_k$. As shown in FIG. 11, a generalised, global, universal model is fitted offline once on dedicated training waveform across multiple cells, providing baseline model parameters $\hat{\alpha}_0$, $\hat{\beta}_0$, $\hat{\gamma}_0$. On power-up (Key On) of the electric car the model is always initialised to this General Model, and in some examples a slightly different model can be provided pre-programmed to which initialisation can be made dependent on the temperature, although in other examples a single room temperature model can be used as the initialisation model, which is then adapted by the online adaptation as the temperature changes. The dynamic model parameters, $\hat{\alpha}_k$, $\hat{\beta}_k$, $\hat{\gamma}_k$ can then be updated on the fly using live i and $v_t$ samples, for example to adapt to local operating conditions, track out battery-battery variation, or account for temporal temperature variations and other ageing effects. The rate of adaptation can be fully controlled, and even bypassed if warranted.

State-of-Charge Estimator: Alternative Embodiment

Figure 12:
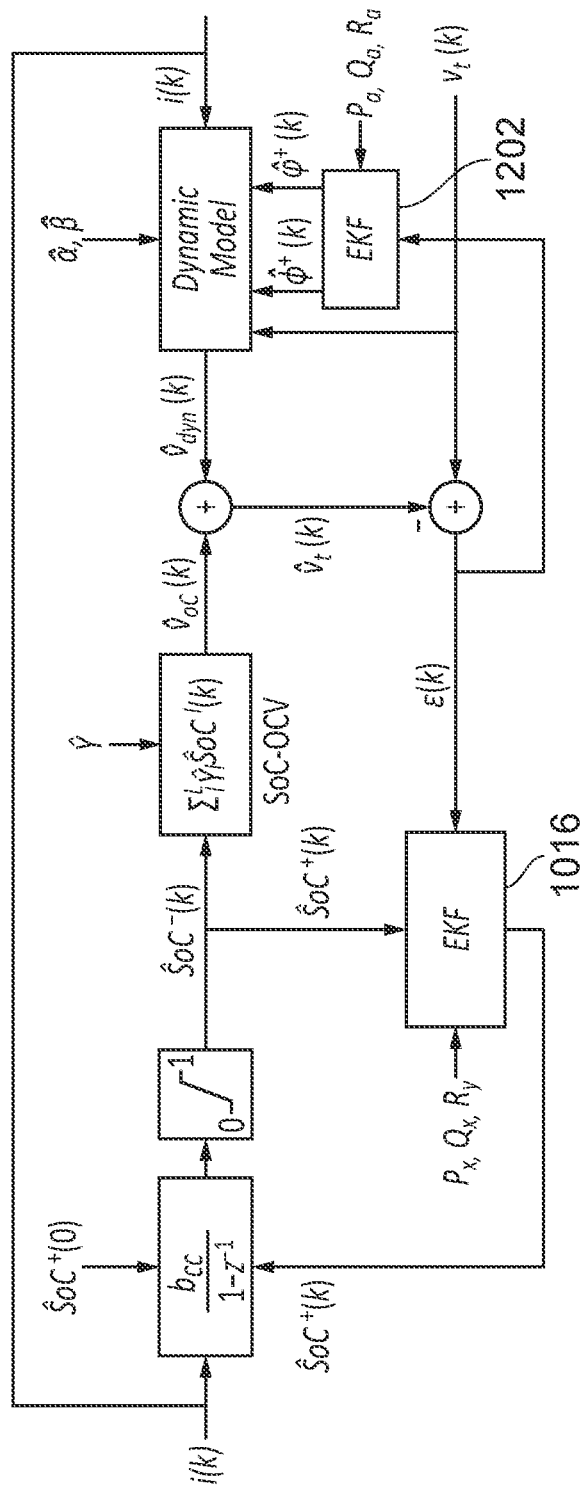
FIG. 12 is a block diagram of a further SoC estimator according to another embodiment of the disclosure.

FIG. 12 illustrates a further embodiment, which is a variant of the above embodiment of FIG. 10, but where a further Kalman filter is used to adapt the current and voltage states in the IIR filters of the dynamic model. To recap, as shown in FIG. 6 the dynamic model has the following characteristics:

- $\hat{v}_{oc}$ is the comparative SoC-OCV hysteresis-free static model, with internal dc state $\phi_o$=SoC
- $\hat{\alpha}_o$ models the series resistance
- Dynamic voltage $\hat{v}_{dyn}$, components composed of ac current $\varphi_m$ and $\phi_m$ voltage (virtual) states
- Time constants, $\tau_m$, of filters are prechosen to span over multiple time scales (seconds to days), $$a_m = e^{-\frac{T_s}{\tau_m}}$$

Model parameters are polynomial terms for DC model $\hat{\gamma}_l$, dynamic current $\hat{\alpha}_{mo}$ and voltage $\hat{\beta}_{mo}$ coefficients.

Within the embodiment of FIG. 12 a second Kalman filter updates the current $\varphi_m$ and $\phi_m$ voltage (virtual) states in the dynamic model in dependence on the error signal ε(k). This has the effect of making the dynamic model more accurate and tolerant (robust) to the measured battery voltage, thus further improving accuracy of the state of charge estimation.

Results

Figure 13:
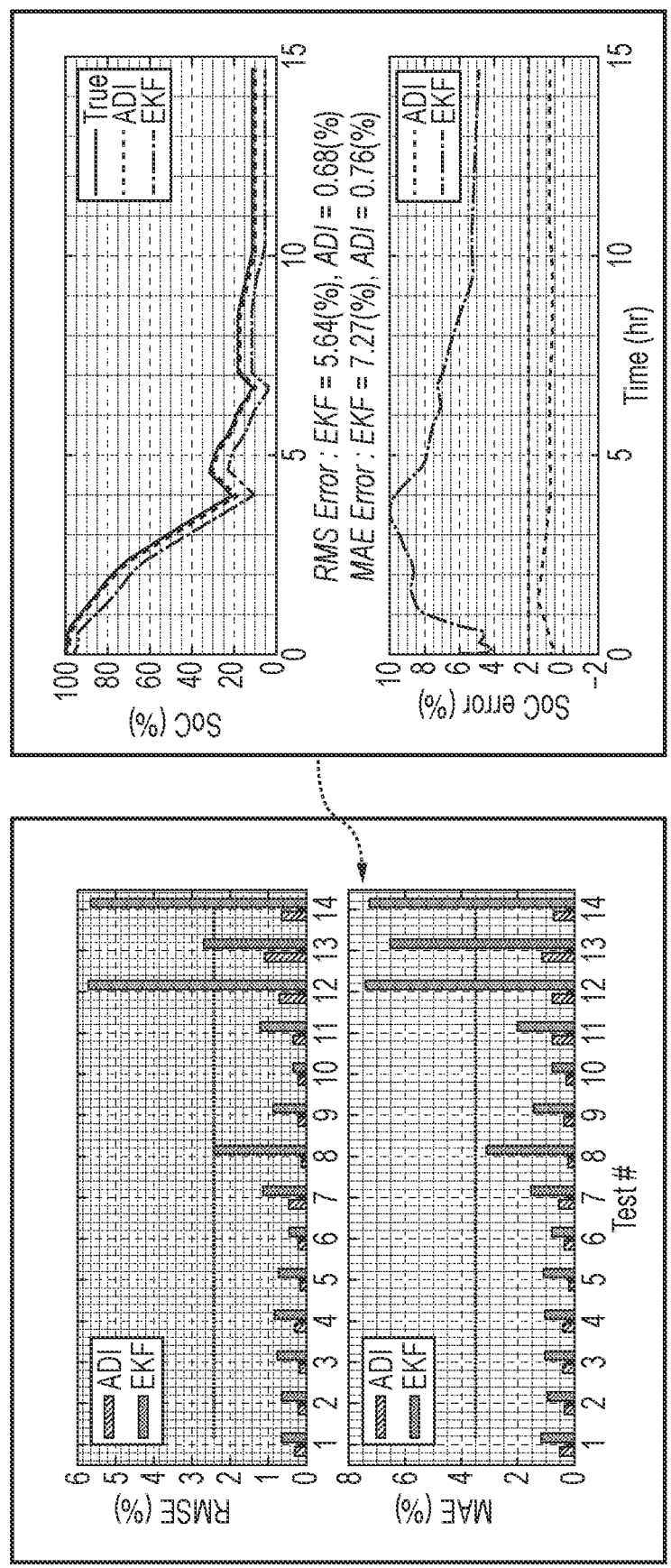
FIG. 13 is a set of graphs illustrating results obtained by the SoC estimator of the present disclosure when compared to other static SoC estimators.

FIG. 13 illustrates test results of embodiments of the invention using the dynamic model to model hysteresis as well as the c static open circuit voltage models. The graphs on the left show two different error measurements (RMS error—top graph, Maximum absolute error—bottom graph) of the system of the present disclosure (labelled "ADI") when compared to a comparative example EKF-updated system that is based on a comparative equivalent circuit model (FIG. 3) that is fitted offline once using a non-convex optimizer. Fourteen (14) different tests were undertaken, as follows:

Tests 1 to 11: Model trained and tested at room temp on a cell #1
Tests 12 and 13: Model trained at room temp on cell #1, tested at −10° C. on cell #1
Test 14: Model trained at room on cell #1, tested at −10° C. on a cell #2.

As will be seen, in all of the tests the embodiments of the present disclosure taking into account dynamic hysteresis effects outperformed the static EKF model, with significantly lower errors. For tests 12 and 13, where model is trained at room temperature but operated at a much lower temperature, the static model had significant error, with MAE of over 6%, compared to sub 2% for the dynamic arrangements of the present disclosure. For test 14, further details showing the State of Charge over time (right hand side upper plot) and the resulting State of Charge error (right hand side lower plot) over time are also given, from where it can be seen that over the whole battery discharge cycle the arrangements of the present disclosure provided a state of charge measurement error of less than 2% over the whole cycle, with the error itself showing very little deviation, whereas the previous fixed no-adaptive EKF arrangement had an error of between 4% and 10% at different times through the discharge cycle.

By taking into account the dynamic charge and discharge characteristics of the battery using the dynamic models described above, as will be seen from FIG. 13 a huge improvement in State-of-Charge estimation accuracy is obtained, with accuracy of less than 2% error over the whole discharge cycle. This will manifest in an electric vehicle as more accurate battery charge figures being displayed to the driver, which in turn will feed into more accurate range figures for the vehicle, thus increasing the confidence drivers have in electric vehicles.

Various modifications may be made to the above embodiments to provide further embodiments. For example, in the above described examples we have effectively described a 'Dual Estimator', in the sense that the 2 Kalman Filter estimators are separated or disjointed, i.e. we have 2 estimators, a Dual approach. Another embodiment would be to combine the 2 estimators in 1 'Joint Estimator', where we would have 1 (joint) set of Kalman Filter equations that jointly estimates the SoC and the model parameters together. Referring to FIG. 7, both estimators are combined into a single composite estimator in such an example.

Moreover, whilst in the above examples we describe the use of infinite impulse response (IIR) filters, in other examples Finite Impulse Response (FIR) filters may be used instead, either as substitutes for the IIR filters or as alternatives to only some of IIR filters (i.e. a mix of FIR and IIR filters may be used).

Various further modifications may be made to the above described embodiments whether by way of addition, subtraction or substitution to provide further embodiments, any and all of which are intended to be encompassed by the appended claims.

The invention claimed is:

1. A method of estimating a State-of-Charge (SoC) of a rechargeable battery, comprising steps of:
  a. measuring a current through the rechargeable battery;
  b. determining a State-of-Charge estimate based on charge already generated by the battery using a coulomb counter that keeps an incremental count of electrical charge passing through battery terminals in dependence on the measured current;
  c. applying the measured current to a static model that models a static voltage response of the rechargeable battery that is hysteresis-free;
  d. applying the measured current to a first dynamic model comprising a first plurality of parallel time-based filters having different respective time constants and a corresponding plurality of polynomials representing virtual battery current states to model a dynamic voltage response of the rechargeable battery, the dynamic voltage response and the static voltage response together representing a total voltage response of the rechargeable battery; and
  e. updating the State-of-Charge estimate of the rechargeable battery in the coulomb counter in dependence on the modelled static and dynamic voltage responses of the rechargeable battery.

2. A method according to claim 1, wherein the first plurality of parallel time-based filters are infinite impulse response (IIR) filters, whereby the dynamic model is linear in its unknowns, the modelling further comprising finding coefficients of the polynomials representing the virtual battery current states adaptively online.

3. A method according to claim 1, wherein the different respective time constants range in length from a shortest duration time constant to a longest duration time constant, with a plurality of intermediate length time constants distributed between the shortest and the longest duration time constants.

4. A method according to claim 3, wherein the different respective time constant lengths are selected in dependence on one or more of:
  a) a spread in ionic diffusion within cells of the rechargeable battery;
  b) charge-discharge voltage hysteresis dynamics of the rechargeable battery;
  c) settling time of current through the battery in response to a Hybrid Pulse Power Characteristic (HPPC) test; and/or
  d) an offline non-convex optimisation algorithm.

5. A method according to claim 1, and further comprising:
  a. measuring the voltage across the rechargeable battery;
  b. applying the measured voltage to a second dynamic model comprising a second plurality of parallel time-based filters having different respective time constants and a corresponding second plurality of polynomials representing virtual battery voltage states;
  c. combining an output of the second dynamic model with the output of the first dynamic model to enhance the modelling of the dynamic voltage response of the rechargeable battery.

6. A method according to claim 5, wherein the second plurality of parallel time-based filters are infinite impulse response (IIR) filters, whereby the second dynamic model is linear in its unknowns, the modelling further comprising finding coefficients of the second plurality of polynomials representing the virtual battery voltage states adaptively online.

7. A method according to claim 6, and further comprising, prior to modeling using the first and second dynamic models, initialising parameters of the first and second dynamic models to predetermined initial values.

8. The method of claim 7, wherein the predetermined initial values are determined using an offline batched model-fitting algorithm.

9. A method according to claim 1, wherein the updating the State-of-Charge estimate further comprises:
 a) estimating battery terminal voltage in dependence on the modelled static voltage response and modelled dynamic voltage response;
 b) measuring the voltage across the rechargeable battery;
 c) generating a voltage error signal corresponding to a difference between the estimated battery terminal voltage and the measured voltage across the rechargeable battery; and
 d) updating the State-of-Charge estimate of the rechargeable battery in the coulomb counter by applying the generated voltage error signal via a closed loop regulation of the coulomb counter.

10. A method according to claim 9, wherein the closed loop regulation of the coulomb counter uses a Kalman filter.

11. A method according to claim 1, and further comprising updating coefficients of the first plurality of parallel time-based filters having different respective time constants and the corresponding plurality of polynomials in dependence on measurements of current through and voltage across the rechargeable battery in order to maintain the first dynamic model as representative of the battery; and repeating the method with the updated coefficients.

12. A State-of-Charge (SoC) estimation system for estimating charge of a rechargeable battery, the system comprising:
 a) a coulomb counter arranged to receive a measurement of the charge provided by a battery under measurement and maintain a state-of-charge count;
 b) a static model that models a static voltage response of the battery that is hysteresis-free;
 c) a dynamic model comprising a first plurality of parallel time-based filters having different respective time constants and a corresponding plurality of polynomials representing virtual battery current and/or voltage states to model a dynamic voltage response of the rechargeable battery, the dynamic voltage response being a remainder of a total voltage response minus the static voltage response; and
 d) a closed-loop controller that receives an error signal representative of a difference between the static and dynamic voltage responses and the state-of-charge count, and generates an updated state-of-charge count in dependence on the received state-of-charge count and the error signal;
 wherein the state-of-charge count maintained on the charge counter is updated to the updated state-of-charge count.

13. A system according to claim 12, wherein the first plurality of parallel time-based filters are infinite impulse response (IIR) filters, whereby the dynamic model is linear in its unknowns, the modelling further comprising finding coefficients of the polynomials representing the virtual battery current and/or voltage states adaptively online.

14. A system according to claim 13, wherein the different respective time constants range in length from a shortest duration time constant to a longest duration time constant, with one or more intermediate length time constants distributed between the shortest and the longest duration time constants.

15. A system according to claim 14, wherein the different respective time constant lengths are selected in dependence on one or more of:
 a) a spread in ionic diffusion within cells of the rechargeable battery;
 b) hysteresis dynamics of the rechargeable battery;
 c) settling time of current through the battery in response to a Hybrid Pulse Power Characteristic (HPPC) test; and/or
 d) an offline optimisation algorithm.

16. A system according to claim 12, wherein the closed-loop controller is a Kalman filter.

17. A system according to claim 12, wherein coefficients of the first plurality of parallel time-based filters having different respective time constants and the corresponding plurality of polynomials are updated in dependence on measurements of current through and voltage across the rechargeable battery in order to maintain the first dynamic model as representative of the battery; the system being further arranged to use the updated coefficients.

18. A system according to claim 12, wherein the system repeatedly operates to maintain a state-of-charge estimation for the battery as the battery is discharged.

19. A system according to claim 12, wherein the battery is a rechargeable battery installed in an electric vehicle (EV).

20. A State-of-Charge (SoC) estimation method for estimating charge of a rechargeable battery, the method comprising:
 a) receiving a measurement of the charge provided by a battery under measurement and maintaining a state-of-charge count using a coulomb counter in dependence on the measurement of the charge;
 b) modelling a static voltage response of the battery using a static model that is hysteresis-free;
 c) modelling a dynamic voltage response of the rechargeable battery using a dynamic model comprising a first plurality of parallel time-based filters having different respective time constants and a corresponding plurality of polynomials representing virtual battery current and/or voltage states, the dynamic voltage response being a remainder of a total voltage response minus the static voltage response; and
 d) generating an updated state-of-charge count using a closed loop controller that receives an error signal representative of a difference between the static and dynamic voltage responses and the state-of-charge count, and generates the updated state-of-charge count in dependence on the received state-of-charge count and the error signal;
 e) updating the state-of-charge count in the coulomb counter to the updated state-of-charge count.

\* \* \* \* \*